US009479983B2

(12) United States Patent
Konrad

(10) Patent No.: US 9,479,983 B2
(45) Date of Patent: Oct. 25, 2016

(54) METHODS AND DEVICE FOR DETERMINING WHEN TO SWITCH BETWEEN MULTIPLE COMMUNICATION MODES OF A TRANSCEIVER SUBSYSTEM

(71) Applicant: Motorola Mobility LLC, Libertyville, IL (US)

(72) Inventor: Daniel C Konrad, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 327 days.

(21) Appl. No.: 14/182,555

(22) Filed: Feb. 18, 2014

(65) Prior Publication Data

US 2015/0181487 A1 Jun. 25, 2015

Related U.S. Application Data

(60) Provisional application No. 61/918,822, filed on Dec. 20, 2013.

(51) Int. Cl.

| | |
|---|---|
| ***H04L 12/26*** | (2006.01) |
| ***H04W 36/14*** | (2009.01) |
| ***H04L 12/58*** | (2006.01) |
| ***H04L 29/06*** | (2006.01) |
| ***H04L 29/08*** | (2006.01) |
| ***H04W 40/24*** | (2009.01) |
| ***H04W 76/04*** | (2009.01) |

(Continued)

(52) U.S. Cl.

CPC .............. *H04W 36/14* (2013.01); *H04L 51/04* (2013.01); *H04L 65/403* (2013.01); *H04L 67/104* (2013.01); *H04W 40/244* (2013.01); *H04W 76/043* (2013.01); *H04L 51/10* (2013.01); *H04L 51/38* (2013.01); *H04W 4/12* (2013.01); *H04W 84/10* (2013.01); *H04W 88/06* (2013.01)

(58) Field of Classification Search

USPC ................................ 370/329, 330, 331, 338

See application file for complete search history.

(56) References Cited

U.S. PATENT DOCUMENTS

| | | | |
|---|---|---|---|
| 8,406,245 | B2 | 3/2013 | Raveendran |
| 2011/0075644 | A1 | 3/2011 | Feder et al. |

(Continued)

FOREIGN PATENT DOCUMENTS

| | | | |
|---|---|---|---|
| EP | 1760958 | A2 | 3/2007 |
| EP | 2615848 | A1 | 7/2013 |

(Continued)

OTHER PUBLICATIONS

International Search Report and Written Opinion for Application No. PCT/US2014/070799 dated Apr. 9, 2015.

*Primary Examiner* — Zewdu A Beyen

(74) *Attorney, Agent, or Firm* — Lerner, David, Littenberg, Krumholz & Mentlik, LLP

(57) ABSTRACT

A communication device performs a method for determining when to switch between multiple communication modes of a transceiver subsystem. The method includes detecting an indication that a multimedia message is ready for transmission. The method also includes switching, by the transceiver subsystem in response to detecting the indication, from an infrastructure communication mode to a peer-to-peer communication mode, and transmitting the multimedia message in the peer-to-peer communication mode. The method further includes determining that the multimedia message transmission is complete, and switching, by the transceiver subsystem, back to the infrastructure communication mode in response to determining that the multimedia message transmission is complete.

20 Claims, 5 Drawing Sheets

302 TRANSCEIVER SUBSYSTEM OPERATES IN INFRASTRUCTURE COMMUNICATION MODE

304 INDICATION DETECTED THAT A MULTIMEDIA MESSAGE IS READY? NO / YES

306 SWITCH, BY THE TRANSCEIVER SUBSYSTEM, FROM THE INFRASTRUCTURE COMMUNICATION MODE TO A PEER-TO-PEER COMMUNICATION MODE IN RESPONSE TO RECEIVING THE INDICATION

308 TRANSMIT THE MULTIMEDIA MESSAGE

310 IS THIS A BEACON INTERVAL? NO / YES

312 HANDLE THE BEACON

314 IS MULTIMEDIA MESSAGE TRANSMISSION COMPLETE? NO / YES

316 RESPONSIVELY SWITCH, BY THE TRANSCEIVER SUBSYSTEM, BACK TO THE INFRASTRUCTURE COMMUNICATION MODE

300

(51) Int. Cl.
*H04W 84/10* (2009.01)
*H04W 4/12* (2009.01)
*H04W 88/06* (2009.01)

(56) References Cited

U.S. PATENT DOCUMENTS

2012/0057697 A1* 3/2012 Holtmanns ........... H04L 9/0838 380/42
2012/0322368 A1 12/2012 Desai et al.
2013/0089010 A1* 4/2013 Richardson ............. H04W 8/22 370/280
2013/0171941 A1 7/2013 Kenney et al.

FOREIGN PATENT DOCUMENTS

WO 2004032536 A2 4/2004
WO 2013016422 A1 1/2013

* cited by examiner

METHODS AND DEVICE FOR DETERMINING WHEN TO SWITCH BETWEEN MULTIPLE COMMUNICATION MODES OF A TRANSCEIVER SUBSYSTEM

RELATED APPLICATIONS

This application is a non-provisional application of commonly assigned U.S. Provisional Patent Application No. 61/918,822, filed on Dec. 20, 2013, from which benefits under 35 USC §119(e) are hereby claimed and the contents of which are hereby incorporated by reference herein.

FIELD OF THE DISCLOSURE

The present disclosure relates to wireless communications and, more particularly, to a method and a communication device for determining when to switch between multiple communication modes of a transceiver subsystem.

BACKGROUND

As a consequence, at least in part, of user demand, wireless communication devices such as smartphones, phablets, and tablets are being developed with more and more functionality. For example, wireless communication devices are desired that can operate in multiple communication modes. Two such communication modes are: an infrastructure mode, where the communication device wirelessly connects to an infrastructure device within a network such as a wireless local area network (WLAN) in order to communicate with other devices for instance within the Internet; and a peer-to-peer communication mode, where the communication device wirelessly communicates directly with a peer communication device without the use of an intermediary infrastructure device.

Certain standards have been developed that support both an infrastructure communication mode and a peer-to-peer communication mode for wireless communications. One such set of wireless communication standards are the 802.11 standards, referred to in the art as Wi-Fi standards or Wi-Fi technology, which were developed by the Institute of Electrical and Electronics Engineers (IEEE). The Wi-Fi standards support regular Wi-Fi (also referred to herein simply as Wi-Fi or Wi-Fi infrastructure) connections with access points in a WLAN to connect to the Internet, for instance, and also support Wi-Fi Peer-to-Peer (also referred to in the art and herein as Wi-Fi Direct) communication with a peer communication device without the use of an access point. Although these two communication modes are available using Wi-Fi technology, the current art fails to adequately address a transceiver subsystem efficiently switching between multiple communication modes, such as between a Wi-Fi infrastructure mode and a Wi-Fi Peer-to-Peer mode.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
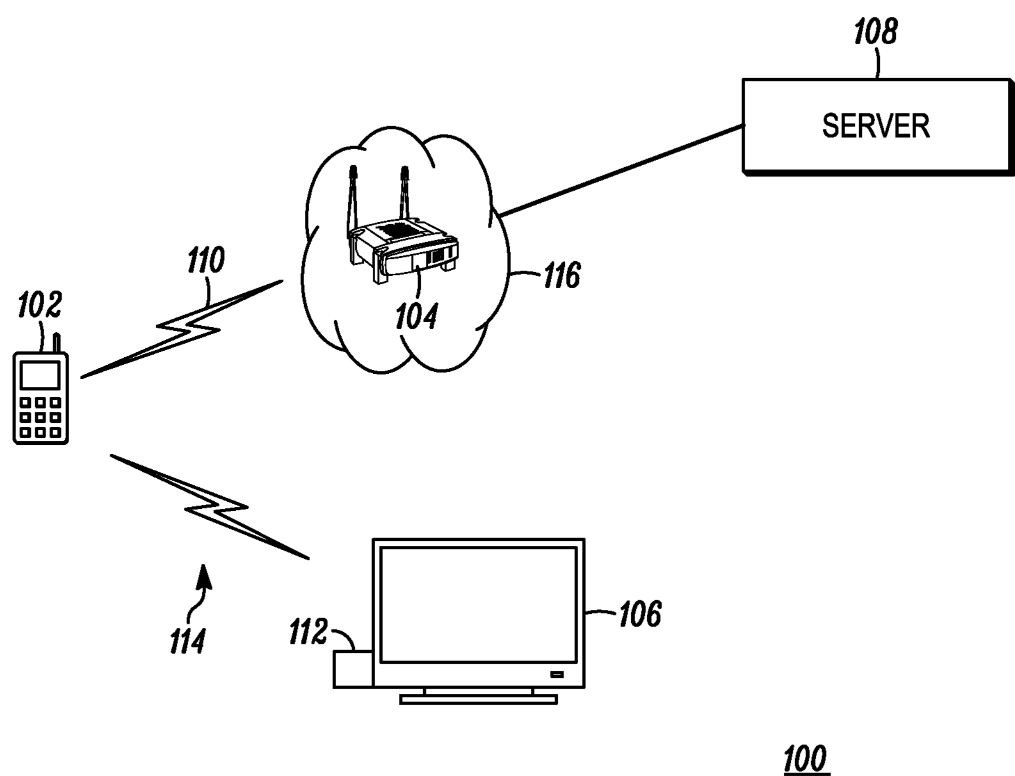
FIG. 1 is a schematic diagram of an example environment within which may be implemented methods and a device for determining when to switch between an infrastructure communication mode and a peer-to-peer communication mode of a transceiver subsystem in accordance with the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of disclosed embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and a communication device for determining when to switch between multiple communication modes of a transceiver subsystem. Accordingly, provided in one embodiment is a method performed by an electronic device, wherein the method includes detecting an indication that a multimedia message is ready for transmission and switching, by the transceiver subsystem in response to detecting the indication, from an infrastructure communication mode to a peer-to-peer communication mode. The method also includes, transmitting the multimedia message in the peer-to-peer communication mode, and determining that the multimedia message transmission is complete. The method further includes switching, by the transceiver subsystem, from the peer-to-peer communication mode to the infrastructure communication mode in response to determining that the multimedia message transmission is complete. As used herein, a communication mode is defined by a transceiver configuration to support a particular wireless link. The transceiver configuration could include, for example, one or more of a particular modulation type, a particular communication protocol or section of a protocol being used, whether or not communications via an infrastructure device or network element is needed, etc.

Also, provided in another embodiment is a communication device configured to switch between different communication modes of a transceiver subsystem. The communication device includes a multimedia subsystem configured to construct a multimedia message and to communicate an indication that the multimedia message is ready for transmission. The communication device also includes a transceiver subsystem coupled to the multimedia subsystem and configured to, in response to detecting the indication that the multimedia message is ready for transmission, switch from an infrastructure communication mode to a peer-to-peer communication mode to transmit the multimedia message, and switch from the peer-to-peer communication mode to the infrastructure communication mode in response to completing the multimedia message transmission.

Turning now to FIG. 1, illustrated therein is a schematic diagram of an example environment within which may be implemented methods and devices for switching between multiple communication modes in accordance with the present teachings. In this particular embodiment a communication device 102, such as a mobile, electronic or portable device, is configured to establish wireless connections or links 110, 114 to external devices, such as, an infrastructure device 104 within a network 116, a display device 106 via a dongle 112 (which collectively function as a peer communication device), as well as other peer communication devices (not shown) capable of wireless connectivity. As used herein, an infrastructure device is part of a network and is used to facilitate communications between endpoint devices. A peer communication device is an endpoint for peer-to-peer communications.

In a particular embodiment, the communication device 102 is configured to operate in both a Wi-Fi infrastructure mode and a Wi-Fi Peer-to-Peer mode. Accordingly, the network 116 is a WLAN network that includes at least one access point, e.g., 104, configured to operate in accordance with Wi-Fi technology in order to support a Wi-Fi connection 110 with the communication device 102 while the device 102 is operating in a Wi-Fi infrastructure communication mode. In a particular implementation, the Wi-Fi link 110 facilitates communications with a server 108 to, for instance using a router (not shown), download content from the Internet. With further regard to the Wi-Fi embodiment, the dongle 112 is configured to operate in accordance with Wi-Fi Peer-to-Peer technology in order to support a Wi-Fi Peer-to-Peer connection 114 with the communication device 102 while the device 102 is operating in a Wi-Fi Peer-to-Peer mode. In a particular implementation, the dongle 112 and the communication device 102 implement the Miracast standard, which enables wireless delivery of compressed standard or high-definition video to the dongle 112 for presenting to the display 106.

Alternative embodiments than those illustrated by reference to FIG. 1 can be implemented in accordance with the present teachings. For example, the display 106 may be configured to communicate directly with the communication device 102 over the peer-to-peer link 114 without using the dongle 112. In addition, instead of a display 106 configured with the dongle 112, the peer communication device could be another type of device such as a desktop, a tablet, a cable box, a printer, etc. Moreover, although the use of Wi-Fi technology is described herein, other standards or proprietary protocols could be used to support wireless communications when the communication device 102 operates in infrastructure communication mode and peer-to-peer communication mode.

Figure 2:
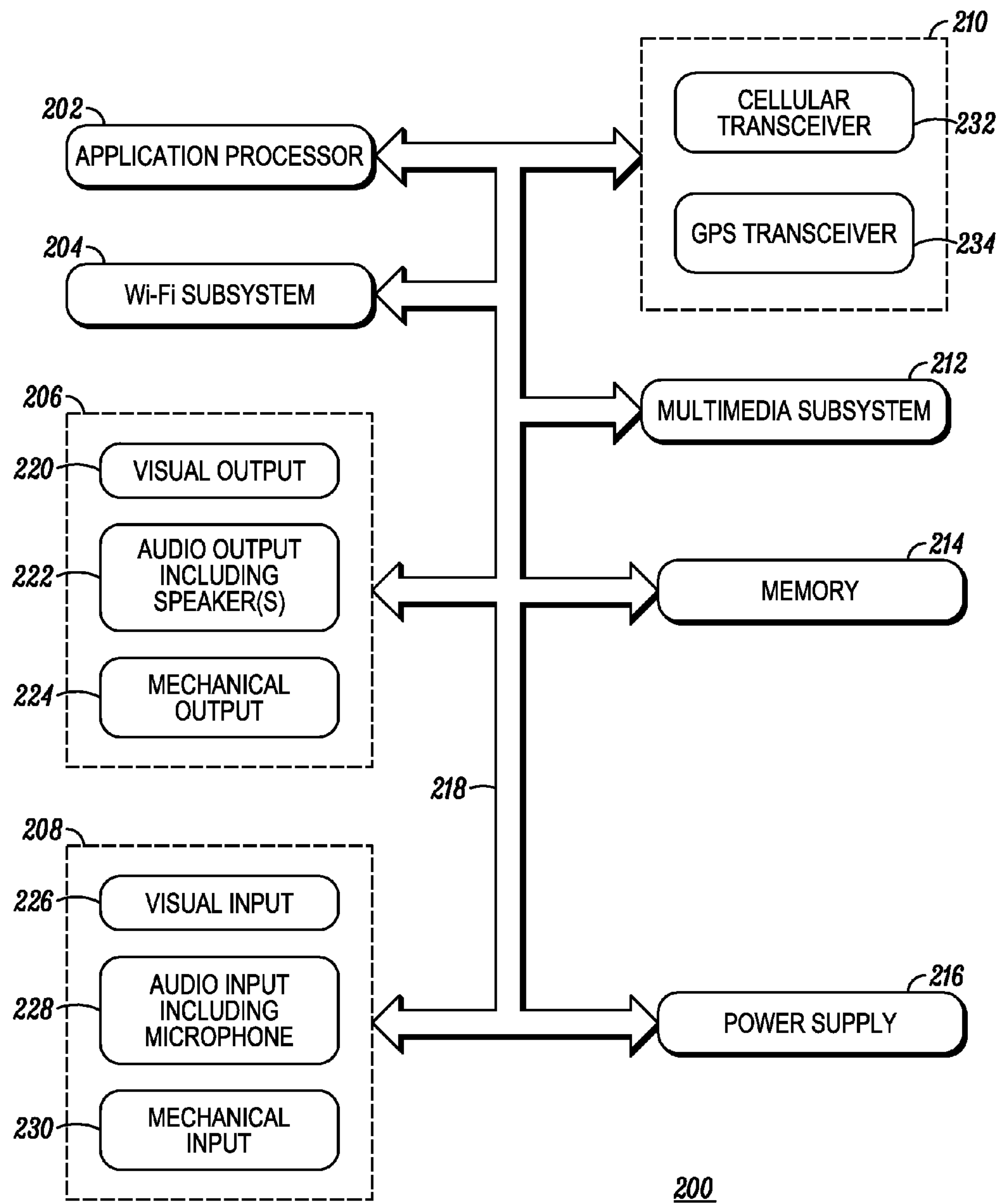
FIG. 2 is a block diagram showing example components of a communication device in accordance with the present teachings.

Referring now to FIG. 2, there is provided a block diagram illustrating example internal components 200 of an electronic device, such as the communication device 102 of FIG. 1, in accordance with the present teachings. The communication device 102 is intended to be representative of a variety of mobile devices including, for example, cellular telephones, personal digital assistants (PDAs), smartphones, or other handheld or portable electronic devices. In alternate embodiments, the communication device 102 is an audio- or video-file player such as a MP3 player, a personal media player (PMP); or another mobile device capable of communicating using multiple communication modes. Moreover, embodiments of the present disclosure are intended to be applicable to any of a variety of electronic devices that are capable of or configured to operate in WLANs including networks supported by the IEEE 802.11 standard.

As shown in FIG. 2, the internal elements or components 200 include one or more processors including an application processor 202, a transceiver subsystem 204 (that in this case is a Wi-Fi subsystem), output components 206, input components 208, wireless transceivers 210, a multimedia subsystem 212, a memory component 214, and a power supply 216. As further illustrated, the internal components 200 are coupled to one another, and in communication with one another, by way of one or more internal communication links 218, for instance an internal bus. A limited number of device components 202, 204, 206, 208, 210, 212, 214, 216, and 218 are shown at 200 for ease of illustration, but other embodiments may include a lesser or greater number of such components in a device, such as device 102. Moreover, other elements needed for a commercial embodiment of a device that incorporates the components shown at 200 are omitted from FIG. 2 for clarity in describing the enclosed embodiments.

We now turn to a brief description of the components within the schematic diagram 200. In general, the processor 202, the Wi-Fi subsystem 204, and/or the multimedia subsystem 212 are configured with functionality in accordance with embodiments of the present disclosure as described in detail below with respect to the remaining FIGS. 3-5. "Adapted," "operative," "capable" or "configured," as used herein, means that the indicated elements or components are implemented using one or more hardware, which may or may not be programmed with software and/or firmware as the means for the indicated elements to implement their desired functionality. The functionality of the processor 202, the Wi-Fi subsystem 204, and/or the multimedia subsystem 212 is supported by the other hardware shown in FIG. 2, including the device components 206, 208, 210, 214, 216, and 218.

Continuing with the brief description of the device components shown at 200, as included within the device 102, the wireless transceivers 210 include a cellular transceiver 232 and a Global Positioning System (GPS) transceiver 234. More particularly, the cellular transceiver 232 is configured to conduct cellular communications of data over wireless connections using any suitable wireless technology, such as Third Generation (3G), Fourth Generation (4G), 4G Long Term Evolution (LTE), vis-à-vis cell towers or base stations. In other embodiments, the cellular transceiver 232 is configured to utilize any of a variety of other cellular-based communication technologies such as analog communications (using Advanced Mobile Phone System—AMPS), digital communications (using Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.), and/or next generation communications (using Universal Mobile Telecommunication System (UMTS), Wideband CDMA (WCDMA), LTE, Institute of IEEE 802.16, etc.) or variants thereof. In one embodiment, the GPS transceiver 234 enables the determination of the geographic location of the communication device 102.

In the embodiment shown, the output components 206 include: one or more visual output components 220 such as a liquid crystal display and/or light emitting diode indicator; one or more audio output components 222 such as a speaker, alarm, and/or buzzer; and one or more mechanical output components 224 such as a vibrating mechanism. Similarly, the input components 208 include imaging apparatus that in this case includes a visual input 226; one or more acoustic or audio input components 228 such as one or more transducers (e.g., microphones), including for example a microphone array and beamformer arrangement or a microphone of a Bluetooth headset; and one or more mechanical input components 230 such as a touchscreen display, a flip sensor, keyboard, keypad selection button, and/or switch.

In an embodiment, the Wi-Fi subsystem 204 is implemented an integrated circuit configured to operate as transceiver hardware that is configured within the hardware or by executing software or firmware to operate in multiple communication modes, in particular an infrastructure communication mode and a peer-to-peer communication mode, in accordance with the present teachings. In one embodiment, the Wi-Fi subsystem 204 includes a stack having the Android operating system in communication with a supplicant, which is in communication with a driver, which is communication with a kernel. The supplicant communicates with the driver to provide control functionalities of the Wi-Fi subsystem 204. The kernel provides networking functions, and the driver handles data. The Wi-Fi subsystem 204 is further configured to conduct Wi-Fi communications with both an access point and a peer device, but not simultaneously, using various bands and channels of the IEEE 802.11 (a, b, g, or n) and/or Wi-Fi Peer-to-Peer standards.

Display hardware captures an image and provides the captured image to the multimedia subsystem 212. In one embodiment, the multimedia subsystem 212 includes an integrated circuit that is on a die which also includes the Wi-Fi subsystem 204. The multimedia subsystem 212 is configured to obtain captured multimedia image content which is, but not limited to, voice and video data from a display component of the device 102. The multimedia subsystem 212 performs message processing through, for example, encoding, encrypting, multiplexing and/or formatting the multimedia content into data chunks referred to in the art as packets and frames but referred to herein in general as messages. The multimedia subsystem 212 communicates the assembled message to one or more of the components 202, 204, 206, 208 210, and/or 214 for transmission, storage, or further processing.

The memory component 214 encompasses, in some embodiments, one or more memory elements of any of a variety of forms, for example read-only memory, random access memory, static random access memory, dynamic random access memory, etc. In an embodiment, the processor 202, the Wi-Fi subsystem 204, and/or the multimedia subsystem 212 have access to and use the memory component 214 to store and retrieve data. In some embodiments, the memory component 214 is integrated with one or more of the processor 202, the Wi-Fi subsystem 204, and/or the multimedia subsystem 212 into a single component such as on an integrated circuit. However, such a single component still usually has distinct portions/sections that perform the different processing and memory functions.

The memory component 214 stores data including, but not limited to, operating systems, programs (applications), and informational data. Each operating system includes executable code that controls basic functions of the electronic device 102, such as interaction among the various components included among the internal components 200, communication with external devices via the wireless transceivers 210 and the Wi-Fi subsystem 204, and storage and retrieval of programs and data, to and from the memory component 214. As for programs, each program includes executable code that utilizes an operating system to provide more specific functionality, such as file system service and handling of protected and unprotected data stored in the memory component 214. Such programs include, among other things, programming for enabling the communication device 102 to perform methods or processes such as those described below by reference to FIGS. 3-5. Finally, with respect to informational data, this is non-executable code or information that an operating system or program references and/or manipulates, in one embodiment, for performing functions of the communication device 102. The power supply 216, such as a battery, provides power to the other internal components 200 while enabling the mobile device 102 to be portable.

Figure 3:
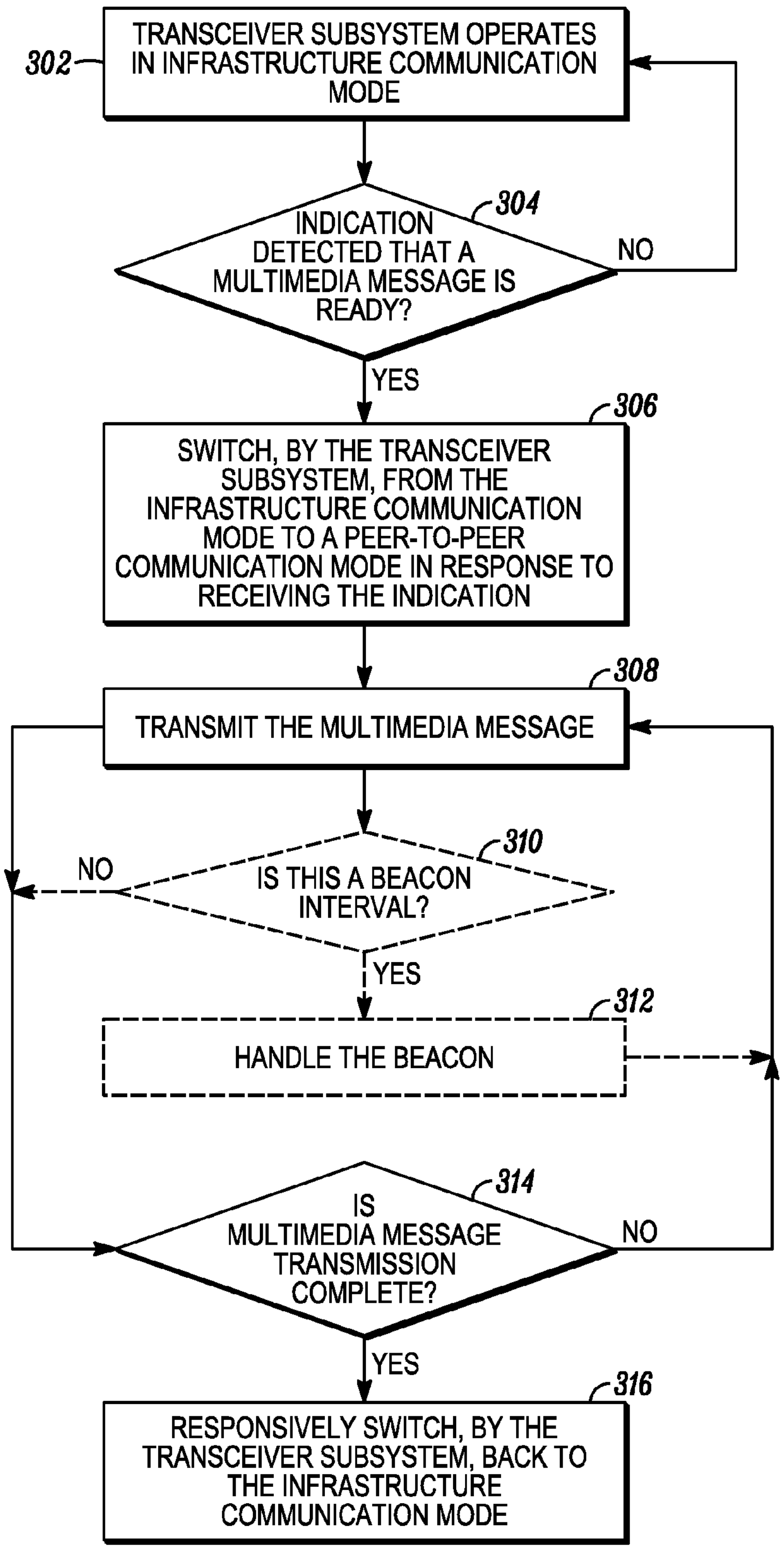
FIG. 3 is a flow diagram illustrating an embodiment of a general method for determining when to switch between an infrastructure communication mode and a peer-to-peer communication mode of a transceiver subsystem in accordance with the present teachings.

Turning now to FIG. 3, which is a flow diagram illustrating a general method 300 for determining when to switch between multiple communication modes of a transceiver subsystem. In some embodiments, the Wi-Fi subsystem 204 alternately communicates in different communication modes, such as, an infrastructure communication mode and/or a peer-to-peer communication mode. In one example, the peer-to-peer communication mode is the Wi-Fi Peer-to-Peer communication mode, and the infrastructure communication mode is the Wi-Fi infrastructure communication mode.

For example, the transceiver subsystem 204 is configured to communicate in a first frequency band while in the peer-to-peer communication mode and communicate in a second frequency band while in the infrastructure communication mode. The first frequency band, in one example, is a 5 gigahertz (Ghz) Wi-Fi frequency band, and the second frequency band is a 2.4 Ghz frequency band. In other examples, one or more of the first or second frequency band is/are the upper 5 Ghz frequency band channels (for example channels 149-165), the lower 5 Ghz frequency band (for example channels 36-48), the 3.6 Ghz frequency band, and/or the 4.9 Ghz frequency band. In another example implementation, the communication device 102 communicates in the peer-to-peer communication mode and the infrastructure communication mode in different channels of a same frequency band. For instance, the transceiver subsystem 204 communicates on one channel in the 5 gigahertz frequency band when performing Wi-Fi communications, and communicates on a different channel within the 5 gigahertz frequency band when performing Wi-Fi Peer-to-Peer communications. In one embodiment, a channel is a legally allowable frequency on which a device may transmit/receive Wi-Fi type messages.

In one example scenario, if a user is watching a video streamed from the server 108 to a display within the communication device 102, the access point 104 communicates the video, which includes a sequence of video frames, to the communication device 102 while the Wi-Fi subsystem 204 operates in the infrastructure communication mode. The multimedia subsystem 212 receives the video frame data from the display hardware of the device 102. The multimedia subsystem 212 processes the video frame data to generate one or more multimedia messages, which in this case is at least one multimedia frame to be sent to the display 106, resulting in the video that a user is displaying on the communication device 102 being mirrored on the display 106.

Returning to the details of the method 300 as relates to the above example scenario, the transceiver subsystem 204 operates 302 in the infrastructure communication mode while the multimedia subsystem 212 is constructing at least one multimedia message, such as a Wi-Fi Peer-to-Peer frame, to provide to an external device such as the external display 106. When the multimedia subsystem 212 finishes constructing a multimedia message that is intended for transmission using Wi-Fi Peer-to-Peer, the multimedia subsystem 212 places the constructed multimedia message in a queue that is accessible to the transceiver subsystem 204, and the multimedia subsystem 212 sends an indication to the transceiver subsystem 204 indicating that the multimedia message is ready for transmission. In one embodiment, the multimedia subsystem 212 sets a flag in a common location, such as shared memory, e.g., a shared queue, to indicate to the transceiver subsystem 204 that a multimedia message is ready for transmission. In other embodiments, the multimedia subsystem 212 communicates an inter-subsystem message, such as an input-output control message, to the transceiver subsystem 204 indicating that the multimedia message is ready for transmission.

The transceiver subsystem 204 continues to operate 302 in the Wi-Fi infrastructure mode and transmit/receive on the regular Wi-Fi channel until it detects 304 an indication that a multimedia message is ready for transmission. For instance, the indication illustratively includes receiving a multimedia message from the multimedia subsystem 214 that constructed the multimedia message indicating that the multimedia message is ready for transmission. In another example, the indication includes the transceiver subsystem 204 detecting the setting of the flag by the multimedia subsystem 214 that constructed the multimedia message indicating that the multimedia message is ready for transmission. Accordingly, while the multimedia subsystem 212 constructs the multimedia message, the transceiver subsystem 204 continues operating 302 in the infrastructure communication mode. When the indication is detected 304, the transceiver subsystem 204 responsively switches 306 from the infrastructure communication mode to the peer-to-peer communication mode in response to detecting the indication. The transceiver subsystem 204 then begins transmitting 308 the multimedia message to the display 106 via the dongle 112. Thus, the transceiver subsystem 204 actually switches its communication mode as a consequence of a multimedia frame being ready for transmission on the Wi-Fi Peer-to-Peer channel or in other words, the switching is performed when the Wi-Fi Peer-to-Peer channel is needed. Otherwise, the transceiver subsystem 204 continues transmitting/receiving on the regular Wi-Fi channel.

In one embodiment, the transceiver subsystem 204 continues to transmit on the Wi-Fi Peer-to-Peer channel, until it determines 314 that all of the multimedia message transmission is complete, i.e., that all of the multimedia message(s) in the queue have/has been transmitted. When the multimedia message transmission 314 is complete, the transceiver subsystem 204 responsively switches 316 from the peer-to-peer communication mode back to the infrastructure communication mode. In one example embodiment, the transceiver subsystem 204 is configured to operate in the infrastructure communication mode unless transmitting multimedia messages to a peer communication device. In other words, the transceiver subsystem 204 operates in the peer-to-peer communication mode only while transmitting multimedia messages to a peer communication device. Otherwise the transceiver subsystem 204 operates in the infrastructure communication mode. Accordingly, time spent on the peer-to-peer communication channel is minimized. Because the transceiver subsystem 204 does not spend any unnecessary time on the peer-to-peer communication channel, the transceiver subsystem is free to process messages coming from the access point 104. Accordingly, the extra time spent handling infrastructure communication messages assists in alleviating problems such as visual artifacts, appearing on the communication device 102 and/or the display 106, and dropped connections.

The Wi-Fi subsystem 204, in some implementations, pauses the transmission of a multimedia message, performs another task, and resumes transmission of the multimedia message. When the Wi-Fi subsystem 204 pauses transmission of the multimedia message, in some embodiments, the Wi-Fi subsystem 204 sends a paused transmission indication to a peer communication device, such as the display 106, as a consequence of pausing the multimedia message transmission. In one example, the paused transmission indication is a notice of absence message. When the Wi-Fi subsystem 204 resumes transmissions to the peer communication device, the Wi-Fi subsystem 204, in one embodiment, sends a resumed transmission indication, such as a non-null frame, to the peer communication device as a consequence of resuming the multimedia message transmission.

In a particular embodiment, the transceiver subsystem 204 pauses transmission of a multimedia message to handle a beacon interval for or in the infrastructure communication mode. For example, the Wi-Fi access point 104 periodically sends out beacon signals that include parameters describing capabilities of the access point 104, supported data rates, information about supported signaling methods, and/or an indication that data is waiting for a specific device, such as the device 102, which is connected to the access point 104. The beacon signal is typically sent at regular or periodic intervals called a beacon interval.

Figure 5:
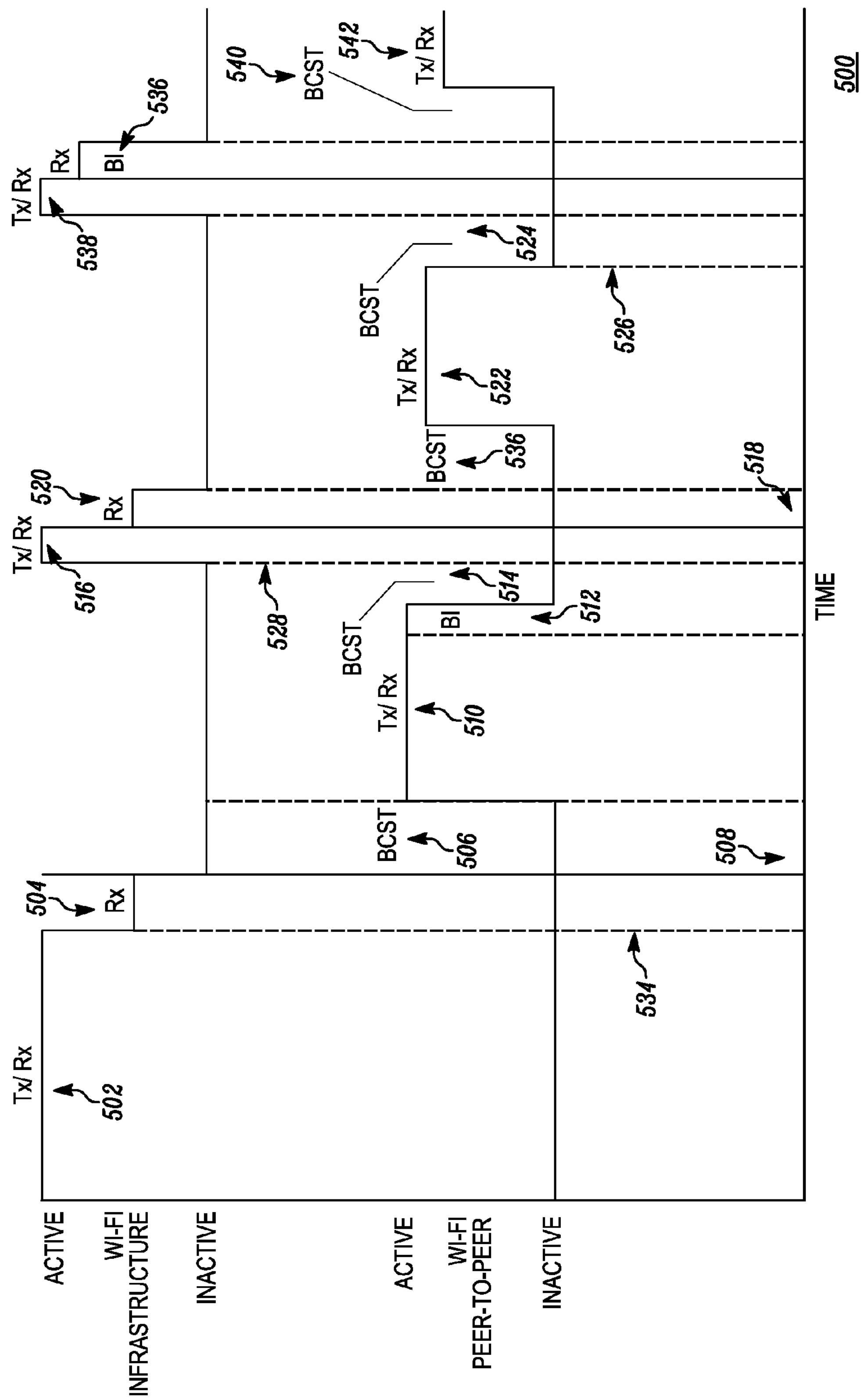
FIG. 5 is a timing diagram illustrating states of a transceiver subsystem switching between an infrastructure communication mode and a peer-to-peer communication mode while handling a beacon interval in accordance with the present teachings.

Returning to method 300 of FIG. 3, in accordance with the embodiment of pausing multimedia frame transmission, as will be further described in relation to FIG. 5, as the transceiver subsystem 204 transmits 308 the multimedia message, the transceiver subsystem 204 determines 310 whether a beacon interval should be handled. If the transceiver subsystem 204 determines 310 that a beacon interval should be handled, the transceiver subsystem 204 handles 312 the beacon interval for the infrastructure communication mode while transmitting the multimedia message in the peer-to-peer communication mode.

In an embodiment, handling 312 the beacon interval includes the transceiver subsystem 204: pausing the multimedia message transmission; switching to the infrastructure communication mode; and processing a received beacon. Then as a consequence of completing the received beacon processing, the transceiver subsystem 204 switches back to the peer-to-peer communication mode and resumes the multimedia message transmission 308.

Figure 4:
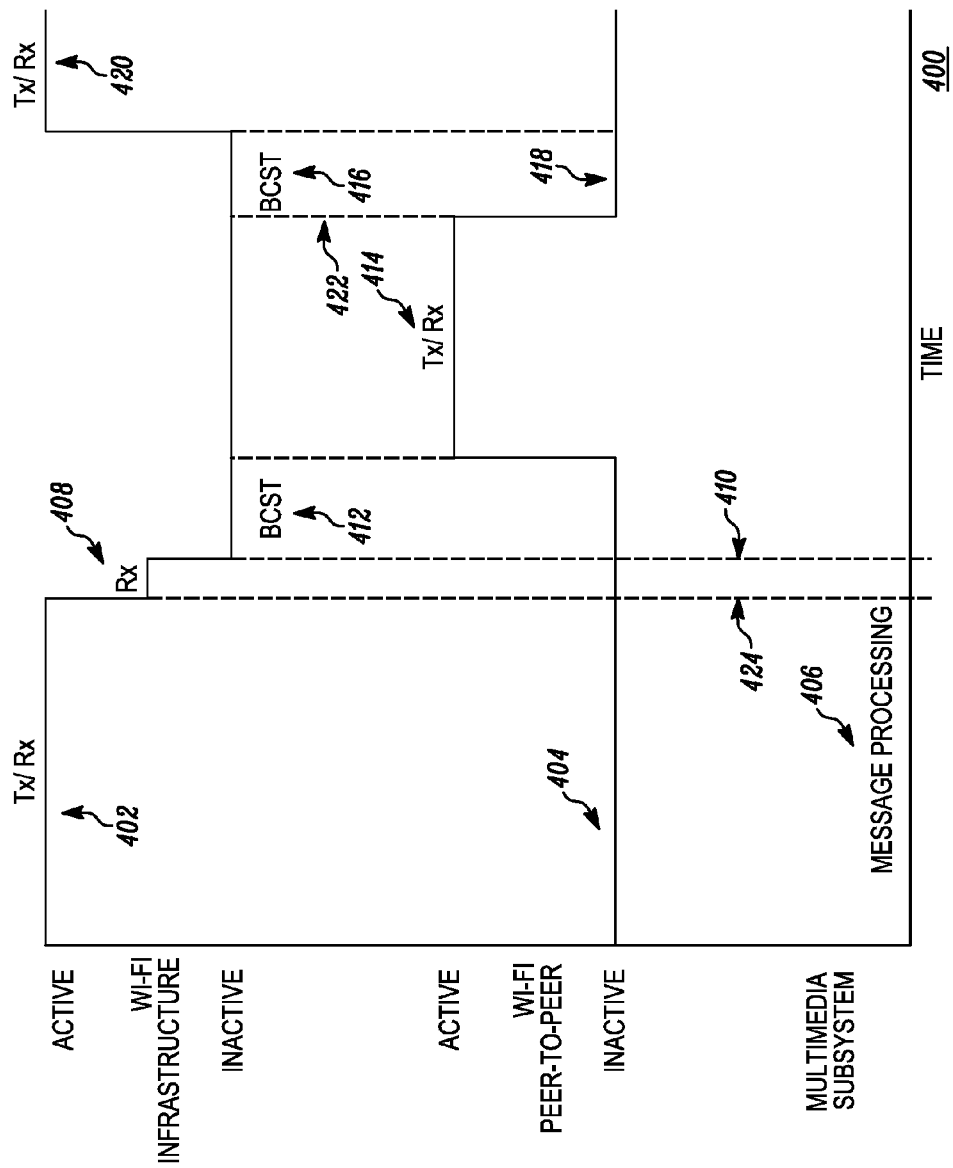
FIG. 4 is a timing diagram illustrating states of a transceiver subsystem that switches between an infrastructure communication mode and a peer-to-peer communication mode in accordance with the present teachings.

Turning now to FIGS. 4 and 5. FIG. 4 illustrates a timing diagram 400 of interactions between a transceiver subsystem, e.g., 204, and a multimedia subsystem, e.g., 212, as the transceiver subsystem 204 switches between an infrastructure communication mode and a peer-to-peer communication mode. The X axis of the timing diagram 400 (and timing diagram 500 of FIG. 5) represents time. The Y axis of the timing diagram 400 (and timing diagram 500) includes designations associated with states of the transceiver subsystem 204 that occur over time. For example, the "WI-FI INFRASTRUCTURE" designation shown on the Y axis of FIGS. 4 and 5 indicates that the transceiver subsystem 204 is in an infrastructure communication mode. The "WI-FI PEER-TO-PEER" designation indicates that the transceiver subsystem 204 is in a peer-to-peer communication mode. The "Active" designation indicates that the transceiver subsystem 204 is actively operating in a particular communication mode, and the "Inactive" designation indicates that the transceiver subsystem 204 is not actively operating in a particular communication mode. For example, the "ACTIVE" indication associated with the "WI-FI INFRASTRUCTURE" indication, denotes that the transceiver subsystem 204 is actively operating in the infrastructure communication mode and, in some examples, is transmitting/receiving on a Wi-Fi band and channel. The "MULTIMEDIA SUBSYSTEM" designation indicates activities that the multimedia subsystem 212 performs.

The example depicted in FIG. 4 starts with the transceiver subsystem 204 actively transmitting and receiving (Tx/Rx) 402 messages in the infrastructure mode and the multimedia subsystem 212 is inactive 404. Thus, the transceiver subsystem 204 is on a Wi-Fi channel while communicating with the access point 104. Simultaneously, the multimedia subsystem 212 is processing 406 a multimedia message for transmission to the display 106. In one embodiment, message processing 406 includes capturing (e.g., from an internal display), encoding, encrypting, and multiplexing a multimedia message for transmission. During the time that the multimedia subsystem 212 processes 406 the multimedia message, the transceiver subsystem 204 continues to transmit/receive 402 on a Wi-Fi channel.

When the multimedia subsystem 212 completes multimedia message processing 406 as indicated at a time 424, the multimedia subsystem 212 places the completed multimedia message in a queue that is accessible to the transceiver subsystem 204, and provides an indication to the transceiver subsystem 204 that the multimedia message is ready for transmission. The transceiver subsystem 204, in response to detecting the indication, switches from the infrastructure communication mode to the peer-to-peer communication mode.

As part of this transition, the transceiver subsystem 204 goes into receive only mode 408 for a short time to allow any outstanding messages from the access point 104 to arrive. At a time indicated at 410, the transceiver subsystem 204 is not actively transmitting/receiving in the infrastructure communication mode and continues transitioning from the infrastructure communication mode to the peer-to-peer communication mode. As part of this transition, in some examples, there is a short band channel switching time (BCST) 412 in which the transceiver subsystem 204 is not transmitting in either the infrastructure communication mode or the peer-to-peer communication mode. After the BCST 412, the transceiver subsystem 204 transmits 414 the multimedia message to the display 106 while active in the peer-to-peer communication mode.

The transceiver subsystem 204, in response to determining that the multimedia message transmission is complete, switches at a time 422 from the peer-to-peer communication mode back to the infrastructure communication mode. Again, there is a short BCST 416 during which the transceiver subsystem 204 is neither communicating in the peer-to-peer communication mode nor the infrastructure communication mode, and the multimedia subsystem 212 returns to an inactive 418 state. As indicated at 420, the transceiver subsystem is active transmitting/receiving messages in the infrastructure communication mode when there are no multimedia frames to transmit. Thus, in the embodiment illustrated, the transceiver subsystem 204 operates in the peer-to-peer communication mode only for transmitting multimedia messages. Otherwise the transceiver subsystem 204 operates in the infrastructure communication mode.

The example described in relation to FIG. 4 does not take into account a beacon interval that the communication device 102 must sometimes accommodate. However, the timing diagram 500 of FIG. 5, which is similar to the timing diagram 400 of FIG. 4, illustrates how a transceiver subsystem handles a beacon interval while operating in the peer-to-peer communication mode. More particularly, FIG. 5, illustrates a timing diagram 500 of an interaction between a Wi-Fi subsystem, e.g., 204, and a multimedia subsystem, e.g., 212, where the Wi-Fi subsystem is configured to handle a beacon interval for an infrastructure communication mode while operating in a multimedia communication mode.

In this example implementation scenario, the transceiver subsystem 204 is operating 502 in the infrastructure communication mode. At a time 534, the multimedia subsystem 212 communicates an indication to the transceiver subsystem 204 in response to completing processing the multimedia message. In response to detecting the indication, the transceiver subsystem 204 switches to the peer-to-peer communication mode. Accordingly, the transceiver subsystem 204 goes into an infrastructure receive only mode 504. At a time indicated by 508, the transceiver subsystem 204 begins a BCST 506 where the transceiver subsystem 204 performs band channel switching. After the transceiver subsystem 204 has completed the band channel switching, the transceiver subsystem 204 transmits 510 one or more packets while operating in the peer-to-peer communication mode.

As indicated at 512, the transceiver subsystem 204 detects an upcoming beacon interval for the infrastructure communication mode. Beacon intervals occur at regular time intervals. Thus, in one embodiment, the transceiver subsystem 204 detects the beacon interval 512 in response to a timer. To accommodate the beacon interval 512, the transceiver subsystem 204 pauses multimedia transmissions 510 and performs a band channel switch denoted by BCST 514 to transition from the peer-to-peer communication mode to the infrastructure communication mode. The BCST 514 completes at a time 528, and the transceiver subsystem 204 processes 516 any access point 104 messaging associated with the beacon interval.

Upon completing the handling of the beacon interval, the transceiver subsystem 204 begins transitioning from the infrastructure communication mode to the peer-to-peer communication mode at a time 518. Thus, the transceiver subsystem 204 first operates 520 in receive only mode, and then performs a band channel switch denoted by BCST 536 to switch to the peer-to-peer communication mode. The transceiver subsystem 204 then completes multimedia transmission 522 previously paused to handling the beacon interval 512. The transceiver subsystem 204 completes sending the multimedia message at a time 526. In response to completing sending the multimedia message, the transceiver subsystem 204 performs a band channel switch, denoted by BCST 524, to switch from the peer-to-peer communication mode to the infrastructure communication mode and then transmits/receives 538 data in the infrastructure communication mode. Thereafter the transceiver subsystem 204 handles another beacon interval 536 for the infrastructure communication mode. The transceiver subsystem 204 then detects an indication that another multimedia message is ready for transmission and switches to the peer-to-peer communication mode. Accordingly, the transceiver subsystem 204 performs a band channel switch, denoted by BCST 540, to transition to the peer-to-peer communication mode in order to transmit 542 the multimedia message.

In some embodiments, the Wi-Fi subsystem 204 sends an indication, such as a null frame, to the access point 104 when the Wi-Fi subsystem 204 will be busy communicating in the peer-to-peer communication mode, and thus will not be able to receive data, for instance. In this particular embodiment, the Wi-Fi subsystem 204 communicates a null frame to the access point 104 upon receipt of an indication from the multimedia subsystem 212 that a multimedia message is ready for transmission. The Wi-Fi subsystem 204 communicates another indication to the access point, such as a non-null frame, to the access point 104 when the Wi-Fi subsystem 204 has completed communicating in the infrastructure communication mode, and thus is ready to handle data from the access point 104.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., including a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method performed by a communication device for determining when to switch between multiple communication modes of a transceiver subsystem, the method comprising:

detecting an indication that a multimedia message is in a queue and ready for transmission;

switching, by the transceiver subsystem in response to detecting the indication, from an infrastructure communication mode to a peer-to-peer communication mode;

transmitting the multimedia message in the peer-to-peer communication mode;

determining that the multimedia message transmission is complete, the determining including accessing the queue and determining that all of the multimedia message in the queue has been transmitted; and switching, by the transceiver subsystem, from the peer-to-peer communication mode to the infrastructure communication mode in response to determining that the multimedia message transmission is complete.

2. The method of claim 1, wherein the peer-to-peer communication mode is a Wi-Fi Peer-to-Peer communication mode, and the infrastructure communication mode is a Wi-Fi infrastructure communication mode.

3. The method of claim 1 further comprising the transceiver subsystem operating in the peer-to-peer communication mode and the infrastructure communication mode using different channels within a same frequency band.

4. The method of claim 3, wherein the transceiver subsystem operates in the peer-to-peer communication mode and the infrastructure communication mode using different channels within a 5 gigahertz frequency band.

5. The method of claim 1 further comprising transmitting the multimedia message in a first frequency band while in the peer-to-peer communication mode, and communicating in a second frequency band while in the infrastructure communication mode.

6. The method of claim 5, wherein the first frequency band is a 5 gigahertz frequency band, and the second frequency band is a 2.4 gigahertz frequency band.

7. The method of claim 1 further comprising handling a beacon interval for the infrastructure communication mode while transmitting the multimedia message in the peer-to-peer communication mode.

8. The method of claim 1, wherein detecting the indication that the multimedia message is ready for transmission comprises receiving a message from a multimedia subsystem that constructed the multimedia message.

9. The method of claim 1, wherein detecting the indication that a multimedia message is ready for transmission comprises detecting setting of a flag by a multimedia subsystem that constructed the multimedia message.

10. The method of claim 1 further comprising operating in the infrastructure communication mode while the multimedia subsystem is constructing the multimedia message.

11. The method of claim 1 further comprising operating in the peer-to-peer communication mode only while transmitting multimedia messages to a peer communication device, otherwise operating in the infrastructure communication mode.

12. A method, comprising:

detecting an indication that a multimedia message is ready for transmission;

switching, by the transceiver subsystem in response to detecting the indication, from an infrastructure communication mode to a peer-to-peer communication mode;

transmitting the multimedia message in the peer-to-peer communication mode;

handling a beacon interval for the infrastructure communication mode while transmitting the multimedia message in the peer-to-peer communication mode, wherein handling the beacon interval comprises:

pausing the multimedia message transmission;

switching to the infrastructure transmission mode;

processing a received beacon, and as a consequence of completing the received beacon processing, switching back to the peer-to-peer communication mode and resuming the multimedia message transmission.

13. The method of claim 12 further comprising sending a paused transmission indication to a peer communication device as a consequence of pausing the multimedia message transmission.

14. The method of claim 13 further comprising sending a resumed transmission indication to the peer communication device as a consequence of resuming the multimedia message transmission.

15. A communication device configured for switching between different communication modes of a transceiver subsystem, the communication device comprising:

a multimedia subsystem configured to construct a multimedia message and to communicate an indication that the multimedia message is in a queue and ready for transmission; and a transceiver subsystem coupled to the multimedia subsystem and configured to, in response to detecting the indication that the multimedia message is ready for transmission, switch from an infrastructure communication mode to a peer-to-peer communication mode to transmit the multimedia message, determine that all of the multimedia message in the queue has been transmitted, and switch from the peer-to-peer communication mode to the infrastructure communication mode in response to completing the multimedia message transmission.

16. The communication device of claim 15, wherein the transceiver subsystem is configured to operate in the infrastructure communication mode unless transmitting multimedia messages to a peer communication device.

17. The communication device of claim 15, wherein the transceiver subsystem is configured to handle a beacon interval for the infrastructure communication mode while transmitting the multimedia message in the peer-to-peer communication mode.

18. The communication device of claim 17, wherein to handle the beacon interval, the transceiver subsystem is configured to:

pause transmission of the multimedia message;

switch to the infrastructure communication mode;

process a received beacon, and as a consequence of completing the received beacon processing, switch to the peer-to-peer communication mode and resume the multimedia message transmission.

19. The communication device of claim 18, wherein the transceiver subsystem is configured to:

send a paused transmission indication to a peer communication device as a consequence of pausing the multimedia message transmission;

send a resumed transmission indication to the peer communication device as a consequence of resuming the multimedia message transmission.

20. The communication device of claim 15, wherein to detect the indication that the multimedia message is ready for transmission, the transceiver subsystem is configured to at least one of:

receive a message from the multimedia subsystem indicating that the multimedia message is ready for transmission;

detect setting of a flag by the multimedia subsystem indicating that the multimedia message is ready for transmission.

* * * * *